(12) United States Patent
Tsuda

(10) Patent No.: US 10,817,759 B2
(45) Date of Patent: Oct. 27, 2020

(54) IMAGE PROCESSING APPARATUS

(71) Applicant: KYOCERA Document Solutions Inc., Osaka (JP)

(72) Inventor: Mineyuki Tsuda, Osaka (JP)

(73) Assignee: Kyocera Document Solutions, Inc. (JP)

( * ) Notice: Subject to any disclaimer, the term of this patent is extended or adjusted under 35 U.S.C. 154(b) by 72 days.

(21) Appl. No.: 16/281,383

(22) Filed: Feb. 21, 2019

(65) Prior Publication Data
US 2019/0266452 A1 Aug. 29, 2019

(30) Foreign Application Priority Data

Feb. 26, 2018 (JP) .................. 2018-032607

(51) Int. Cl.
| | | |
|---|---|---|
| G06K 9/68 | (2006.01) | |
| G06K 9/00 | (2006.01) | |
| G06K 9/72 | (2006.01) | |

(52) U.S. Cl.
CPC ....... G06K 9/6828 (2013.01); G06K 9/00449 (2013.01); G06K 9/00469 (2013.01); G06K 9/72 (2013.01); G06K 2209/01 (2013.01)

(58) Field of Classification Search
CPC .... G06K 9/6828; G06K 9/00449; G06K 9/72; G06K 9/00469; G06K 2209/01; G06K 9/00463
See application file for complete search history.

(56) References Cited

U.S. PATENT DOCUMENTS

| | | | | |
|---|---|---|---|---|
| 6,337,924 B1* | 1/2002 | Smith | .................. | G06K 9/6828 382/175 |
| 6,853,980 B1* | 2/2005 | Ying | ...................... | G06Q 30/06 705/26.62 |
| 9,002,877 B2* | 4/2015 | Fu | ......................... | G06T 11/203 707/769 |
| 2011/0286668 A1* | 11/2011 | Konno | ............... | G06K 9/00463 382/182 |
| 2014/0257789 A1* | 9/2014 | Zaric | .................. | G06K 9/00463 704/8 |
| 2015/0146220 A1* | 5/2015 | Oki | ..................... | H04N 1/00331 358/1.2 |
| 2017/0249526 A1* | 8/2017 | Kawasaki | .......... | G06K 9/00442 |
| 2018/0247166 A1* | 8/2018 | Tsuda | ..................... | G06K 9/344 |
| 2020/0065574 A1* | 2/2020 | Kuhlmann | ............. | G06K 9/344 |

FOREIGN PATENT DOCUMENTS

| | | |
|---|---|---|
| JP | H07-177279 | 7/1995 |
| JP | H10-261048 | 9/1998 |

\* cited by examiner

Primary Examiner — Wesley J Tucker

(57) ABSTRACT

An image processing apparatus includes a character recognizing unit and a font type determining unit. The character recognizing unit is configured to determine a character code of a character in a text of a predetermined process unit in an image. The font type determining unit is configured to determine a font type of the character. Further, the font type determining unit performs a font type determining process; and in the font type determining process, (a) determines a font type on a character by character basis and (b) sets as a specific font type font types of all characters in a text of the predetermined process unit if a ratio of the number of characters with the specific font type to the number of all characters in the text of the predetermined process unit exceeds a predetermined threshold value.

6 Claims, 4 Drawing Sheets

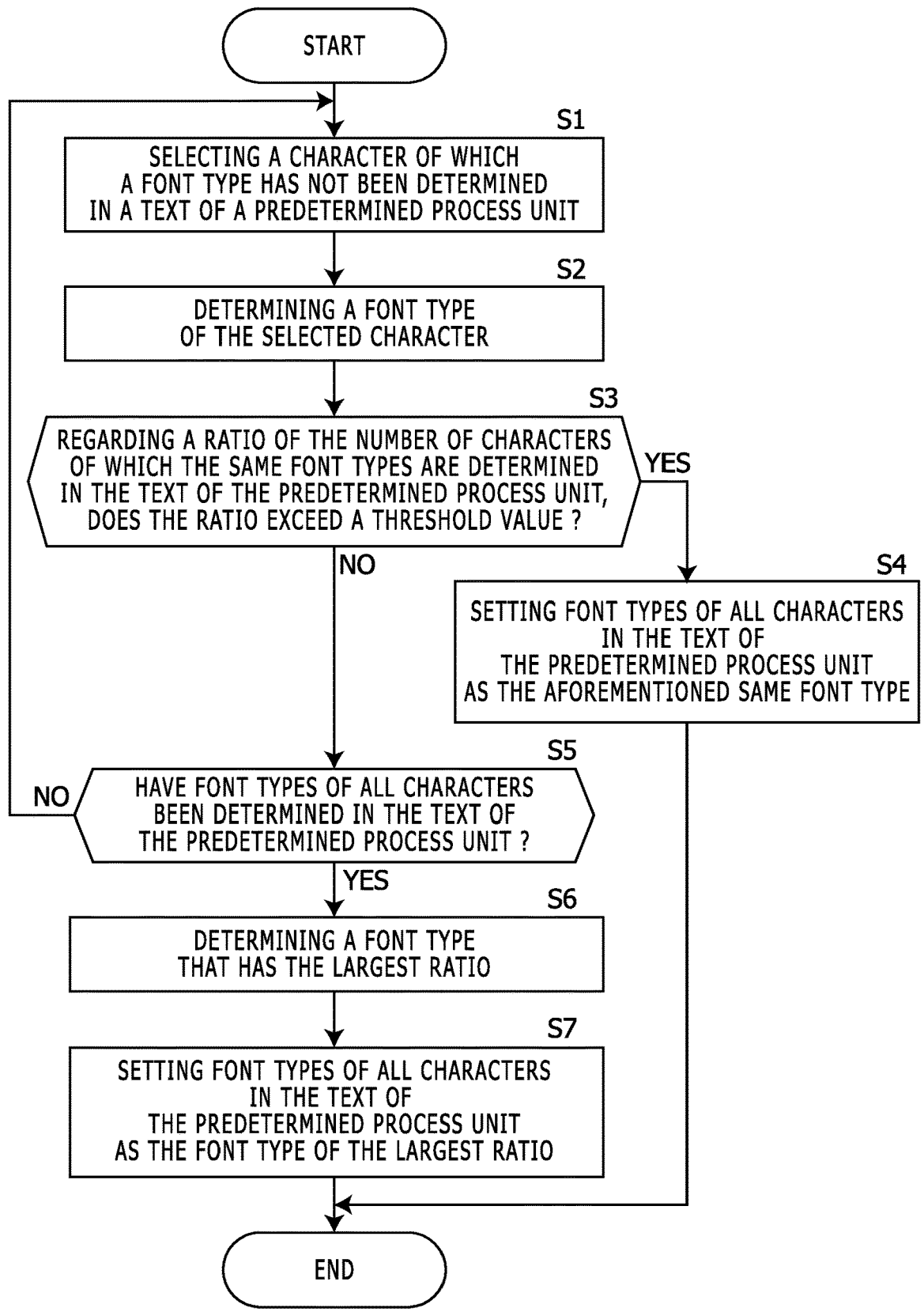

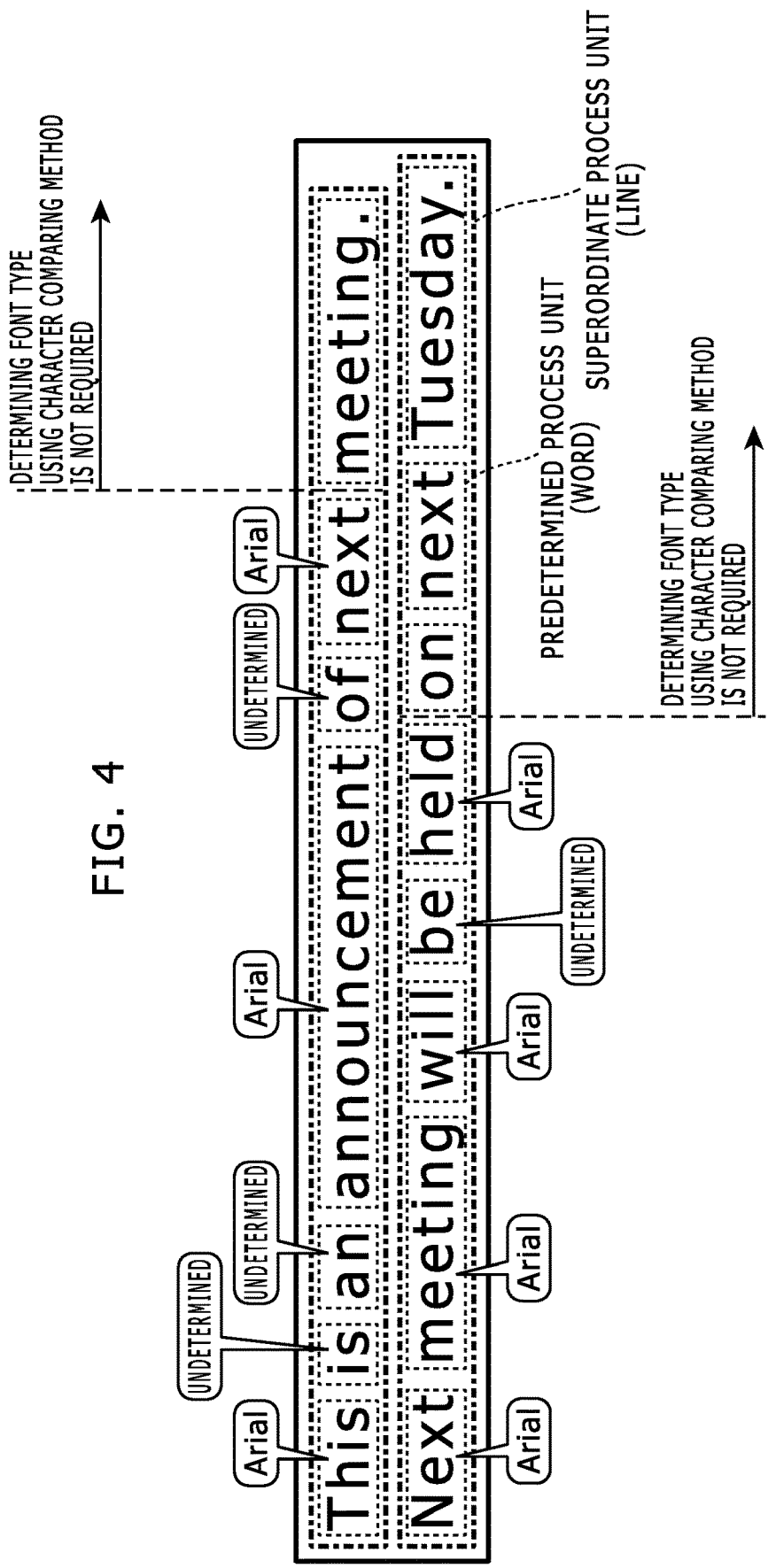

IMAGE PROCESSING APPARATUS

CROSS-REFERENCE TO RELATED APPLICATIONS

This application relates to and claims priority rights from Japanese Patent Application No. 2018-032607, filed on Feb. 26, 2018, the entire disclosures of which are hereby incorporated by reference herein.

BACKGROUND

1. Field of the Present Disclosure

The present disclosure relates to an image processing apparatus.

2. Description of the Related Art

A facsimile apparatus determines a character code and a font type of each character in a document image on a character by character basis.

A character recognizing apparatus determines appearance frequencies of plural font types (in a font dictionary) in plural fields in a business form, and determines a font type of each field on the basis of the appearance frequencies.

However, the aforementioned facsimile apparatus determines a font type on a character by character basis, and therefore, it takes a long time to determine font types of all characters in a text.

Further, the aforementioned character recognizing apparatus determines a font type in a field by field basis for all fields in a business form, and therefore, it takes a long time to determine font types in the whole business form. In addition, the aforementioned character recognizing apparatus determines a font type either for each field in a business form or for each business form, and therefore, it hardly determines a font type of each character in a general document in the same manner.

SUMMARY

An image processing apparatus according to an aspect of the present disclosure includes a character recognizing unit and a font type determining unit. The character recognizing unit is configured to determine a character code of a character in a text of a predetermined process unit in an image. The font type determining unit is configured to determine a font type of the character. Further, the font type determining unit performs a font type determining process; and in the font type determining process, (a) determines a font type on a character by character basis and (b) sets as a specific font type font types of all characters in a text of the predetermined process unit if a ratio of the number of characters with the specific font type to the number of all characters in the text of the predetermined process unit exceeds a predetermined threshold value.

These and other objects, features and advantages of the present disclosure will become more apparent upon reading of the following detailed description along with the accompanied drawings.

BRIEF DESCRIPTION OF THE DRAWINGS

FIG. 3 shows a flow chart that explains a behavior of the image processing apparatus in Embodiment 1; and FIG. 4 shows a diagram that explains a behavior of the image processing apparatus in Embodiment 3.

DETAILED DESCRIPTION

Hereinafter, embodiments according to an aspect of the present disclosure will be explained with reference to drawings.

Embodiment 1

Figure 1:
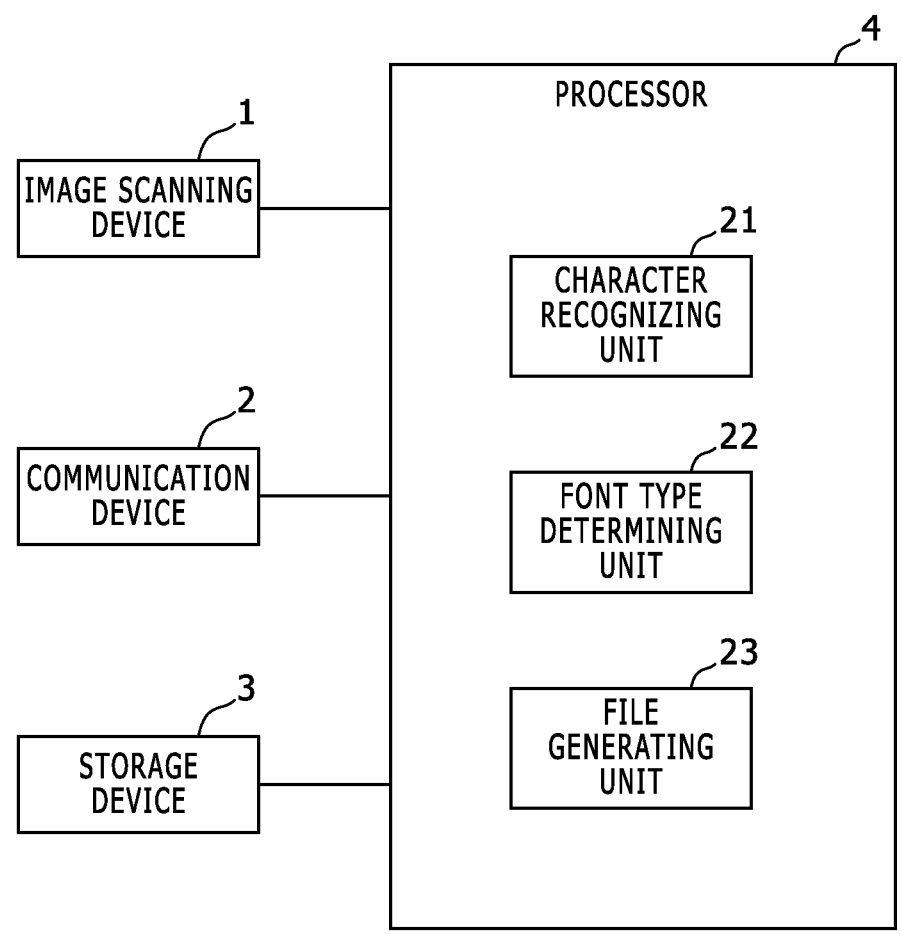
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. The image processing apparatus shown in FIG. 1 includes an image scanning device 1, a communication device 2, a storage device 3, and a processor 4.

The image scanning device 1 scans a document image of a document including a text, and generates raster image data of the document image.

The communication device 2 performs data communication with an external device (not shown) and receives raster image data of an image including a text.

The storage device is a non volatile storage device and stores raster image data of an image including a text.

The processor 4 includes a computer that executes a program, an ASIC (Application Specific Integrated Circuit) and/or the like and acts as processing units using the computer, the ASIC and/or the like.

Here the process 4 acts as a character recognizing unit 21, a font type determining unit 22, and a file generating unit 23.

The character recognizing unit 21 determines a character code of a character in a text of a predetermined process unit in an image (raster image) based on the raster image data using a known method.

The font type determining unit 22 performs a font type determining process and thereby determines a font type of the aforementioned character of which a character code is determined.

Specifically, in the font type determining process, the font type determining unit 22 (a) determines a font type on a character by character basis using a known character comparing method, and (b) sets as a specific font type font types of all characters in a text of the predetermined process unit if a ratio of the number of characters with the specific font type to the number of all characters in the text of the predetermined process unit exceeds a predetermined threshold value. Therefore, a font type of a character of which a font type is not determined until the ratio exceeds the predetermined threshold value is determined without performing a process to determine a font type using the aforementioned known character comparing method. Consequently, the font type determining process for a text of the predetermined process unit is finished in a short time.

In the aforementioned character comparing method, for example, a character image of a target character and character images of plural font types registered in a font dictionary (i.e. character images associated with a character code of the target character) are compared with each other, and it is determined that the target character has a font type with the largest likelihood that the both agree with each other.

Figure 2:
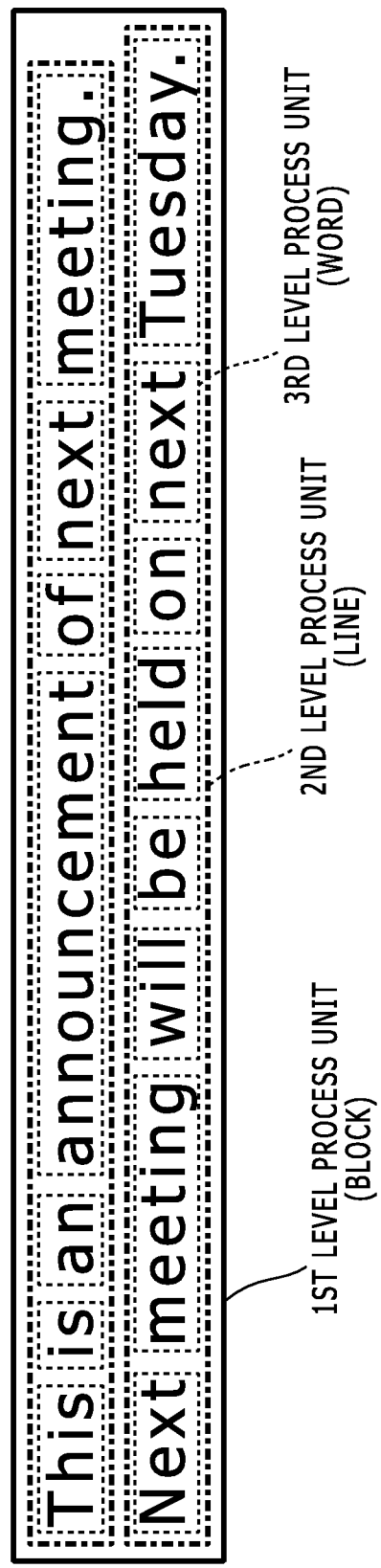
FIG. 2 shows a diagram that explains predetermined process units in a font type determining process.

FIG. 2 shows a diagram that explains predetermined process units in a font type determining process. This "predetermined process unit" is word, line, block or the like as shown in FIG. 2 for example, and is set as a unit of a set of one or more characters of which a character code is determined by the character recognizing unit 21. In other words, the character recognizing unit 21 considers word, line, block or the like as a unit, and generates a set of one or more character codes of one or more characters included in a word, a line, a block or the like (i.e. unit); and the font type determining unit 22 acquires one character code for each set of the one or more characters as unit, and thereby determines a text of the predetermined process unit.

For example, when the predetermined process unit is word, and the aforementioned threshold value is 50 percent, if a text of the predetermined process unit is "This", then font types of the character "T", the character "h", and the character "i" are determined in turn from the top using the known character comparing method; and if all the font types of the characters "T", "h" and "i" are determined as "Arial", then a font type of the remaining character "s" is not determined using the known character comparing method and is determined as "Arial" immediately after the font type the character "i" is determined.

Further, in Embodiment 1, if no ratios of all font types of characters in a text of the predetermined process unit exceed the predetermined threshold value even though the font type determining unit determines the font types character by character using the aforementioned character comparing method, then the font type determining unit 22 sets font types of all characters in the text of the predetermined process unit as a font type with the largest ratio.

For example, when the predetermined process unit is word, and the aforementioned threshold value is 50 percent, if a text of the predetermined process unit is "This", then font types of the character "T", the character "h", the character "i", and the character "s" are determined in turn from the top using the known character comparing method; and if the font type of the character "T" is determined as Gothic, the font type of the character "h" is determined as Mincho, and the font types of the characters "i" and "s" are determined as "Arial", then font types of all characters in the word "This" are determined as "Arial" that is the font type of which the aforementioned ratio is largest (i.e. 50 percent).

The file generating unit 23 generates a document data file that includes a character code and font type of each character in a text with a predetermined file type (for example, PDF or a file type assigned for a specific application (e.g. Microsoft product)). The generated document data file is stored in the storage device 3 or transmitted to an external device using the communication device 2.

The following part explains a behavior of the image processing apparatus in Embodiment 1. FIG. 3 shows a flow chart that explains a behavior of the image processing apparatus in Embodiment 1.

After finishing the character recognizing process of a text of the predetermined process unit in the character recognizing unit 21, the font type determining unit 22 performs the font type determining process mentioned below for the text of the predetermined process unit.

The font type determining unit 22 selects one of one or more characters (one or more character codes) of which a font type has not been determined in the text of the predetermined process unit (in Step S1). Here one character is selected in turn from the top of the text of the predetermined process unit.

Subsequently, the font type determining unit 22 determines a font type of the selected character using the known character comparing method (in Step S2). For example, the font type determining unit 22 determines a font type of the selected character as a font type that has a likelihood that is larger than a predetermined likelihood and largest for the selected character; and if no font types larger than the predetermined likelihood are detected for the selected character, then a font type of the selected character is determined as "undetermined".

Subsequently, the font type determining unit 22 determines a ratio of the number of characters with font types same as the determined font type to the number of all characters in the text of the predetermined process unit, and determines whether the determined ratio exceeds a predetermined threshold value or not (in Step S3). The number of characters in each text of the predetermined process unit is determined on the basis of a result of the character recognizing process (i.e. the number of character codes determined for each text). Further, when the number of characters in a text of the predetermined process unit is expressed as N and the predetermined threshold value is expressed as TH (0<TH<1), the font type determining unit 22 may skip the determination processes in Steps S3 and S5 until the number of characters of which font types have been determined using the known character comparing method exceeds the value of (N*TH), and thereby may continuously determine the font types using the known character comparing method.

If the aforementioned ratio exceeds the predetermined threshold value regarding any of font types determined until the current timing in the text of the predetermined process unit, then the font type determining unit 22 sets font types of all characters in the text of the predetermined process unit as a font type of which the aforementioned ratio exceeds the predetermined threshold value (in Step S4).

Contrarily, if no ratios exceed the predetermined threshold value regarding font types determined until the current timing in the text of the predetermined process unit, then the font type determining unit 22 determines whether font types of all characters in the text of the predetermined process unit have been determined or not (in Step S5). If a font type of at least one character in the text of the predetermined process unit has not been determined, then returning to Step S1, the font type determining unit 22 selects a next character of which a font type has not been determined.

Thus, a font type of a character is determined on a character by character basis using the known character comparing method until a font type appears of which the aforementioned ratio exceeds the predetermined threshold value (in Step S3) or font types of all the characters are determined using the known character comparing method (in Step S5).

For example, when the predetermined threshold value is 50 percent and the word "This" in FIG. 2 is a text of the predetermined process unit, if a font type of the top character "T" has been determined as "Arial" and the characters "h", "i" and "s" have not been processed yet, then the aforementioned ratio is 25 percent because the number of all characters is 4 and the number of characters with the font type "Arial" is 1, and therefore it is determined that the ratio does not exceed the predetermined threshold.

For example, when the predetermined threshold value is 50 percent and the word "This" in FIG. 2 is a text of the predetermined process unit, if font types of the top characters "T", "h" and "i" have been determined as "Arial" and the character "s" has not been processed yet, then the aforementioned ratio is 75 percent because the number of all characters is 4 and the number of characters with the font type "Arial" is 3, and therefore it is determined that the ratio exceeds the predetermined threshold and a font type of the character "s" of which the font type has not been determined using the known character comparing method is set as "Arial".

It should be noted that if a font type is set in the aforementioned manner in Step S4 of a character of which the font type has not been determined using the known character comparing method, then determining a font type using the known character comparing method is not performed for this character.

Meanwhile, if font types of all characters have been determined using the known character comparing method in the text of the predetermined process unit (in Step S5), then the font type determining unit 22 determines a font type with the largest ratio among font types determined in the text of the predetermined process unit (in Step S6), and sets the font types of all characters in the text of the predetermined process unit as the font type determined in Step S6 (in Step S7).

In the aforementioned manner, a font type of the text of the predetermined process unit is determined, and if the result of the character recognizing process includes plural texts of the predetermined process unit (e.g. plural words or plural lines), then a next text of the predetermined process unit is selected and processed in the same manner as mentioned.

As mentioned, in Embodiment 1, the character recognizing unit 21 determines a character code of a character in a text of a predetermined process unit in an image. The font type determining unit 22 performs a font type determining process for the text of the predetermined process unit; and in the font type determining process, (a) determines a font type on a character by character basis and (b) sets as a specific font type font types of all characters in a text of the predetermined process unit if a ratio of the number of characters with the specific font type to the number of all characters in the text of the predetermined process unit exceeds a predetermined threshold value.

Consequently, the number of characters of which font types should be determined using the known character comparing method is reduced and therefore font types of characters in an image are determined in a short time.

Embodiment 2

In an image processing apparatus of Embodiment 2, if the predetermined process unit is word, then the font type determining unit 22 (a) performs the aforementioned font type determining process (i.e. a process substantially identical to the process in Embodiment 1) for a word of one character and a word of three or more characters and (b) performs the following process for a word of two characters.

In Embodiment 2, for a word of two characters, if a font type of a previous word to this word of two characters and a font type of a next word to this word of two characters are identical to each other, the font type determining unit 22 sets a font type of this word of two characters as a font type identical to the font type of either the previous word or the next word.

For example, in Embodiment 2, for the word of two characters, the font type determining unit 22 (b1) without performing the aforementioned font type determining process, sets a font type of the word of two characters as a font type identical to a font type of either a previous word or a next word to the word of two characters if a font type of the previous word and a font type of the next word are identical to each other, and (b2) performs the aforementioned font type determining process if a font type of the previous word and a font type of the next word are different from each other.

Further, for example, in Embodiment 2, here, the font type determining unit 22 may determine a font type of each character in a word of two characters using the known character comparing method; if thereby the identical font types of two characters are not determined to each other and the a font type of a previous word to this word of two characters and a font type of a next word to this word of two characters are identical to each other, then the font type determining unit 22 may set a font type of the word of two characters as a font type identical to the font types of the previous and the next words; and if thereby the identical font types of two characters are determined to each other, then the font type determining unit 22 may set a font type of the word of two characters as the determined font types regardless of the font types of the previous and the next words.

Furthermore, in Embodiment 2, when there are two or more continuous words of two characters (e.g. "is" and "an" in FIG. 2), if it is determined that a word previous to the first word (e.g. "is" in FIG. 2) among the continuous words (e.g. "This" previous to "is" and "an" in FIG. 2) and a word next to the last word (e.g. "an" in FIG. 2) among the continuous words (e.g. "announcement" next to "is" and "an" in FIG. 2) have identical font types to each other, then font types of the continuous words (e.g. "is" and "an" in FIG. 2) may be set as a font type identical to the font types of the previous and the next words (e.g. "This" and "announcement" in FIG. 2).

In general, many words of two characters such as be-verb and preposition themselves do not have significant meaning and it is unlikely that a font type of such a word of two characters has been set so as to be different from font types of the previous and the next words, and therefore, in Embodiment 2, the aforementioned process is performed. In addition, a word of one character is sometimes an article "a" or a character used as a symbol, and therefore a font type of such a word of one character is determined using the known character comparing method.

Other parts of the configuration and behaviors of the image processing apparatus in Embodiment 2 are identical or similar to those in Embodiment 1, and therefore not explained here.

Embodiment 3

In an image processing apparatus of Embodiment 3, for a text of a superordinate process unit of the predetermined process unit, the font type determining unit 22 sets as a specific font type font types of all characters in a text of the superordinate process unit if a ratio of the number of texts of the predetermined process unit with the specific font type to the number of all texts of predetermined process unit in the text of the superordinate process unit exceeds a predetermined threshold value.

For example, in Embodiment 3, the predetermined process unit is word, and the superordinate process unit is either a line or a block as a set of lines. In other words, a text of the superordinate process unit consists of plural texts of the predetermined process unit.

FIG. 4 shows a diagram that explains a behavior of the image processing apparatus in Embodiment 3.

For example, when each line of two lines in a block shown in FIG. 2 is set as a text of the superordinate process unit, each word in each line is set as a text of the predetermined process unit, and the predetermined threshold value is set as 40 percent, as shown in FIG. 4, if font types of the three words "This", "announcement" and "next" are determined as "Arial" at a timing that the font type determining process is finished for six words among seven words in the first line, then without determining a font type of the remaining one word "meeting" using the known character comparing method, the font type of the word "meeting" (and font types of the words "is" and "an" of which font types are "undetermined") are set as "Arial".

Further, in this case, as shown in FIG. 4, if font types of the four words "Next", "meeting", "will" and "held" are determined as "Arial" at a timing that the font type determining process is finished for five words among eight words in the second line, then without determining a font type of the remaining three words "on", "next" and "Tuesday" using the known character comparing method, the font type of the words "on", "next" and "Tuesday" (and a font type of the word "be" of which font types are "undetermined") are set as "Arial".

Other parts of the configuration and behaviors of the image processing apparatus in Embodiment 3 are identical or similar to those in Embodiment 1 or 2, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1, 2 or 3, if a text of predetermined process unit includes a range surrounded by parentheses, brackets or quotation marks, then the range may be extracted and the aforementioned process may be performed for the extracted range as an independent text of the predetermined process unit.

What is claimed is:

1. An image processing apparatus, comprising:
   a character recognizing unit configured to determine a character code of a character in a text of a predetermined process unit in an image; and
   a font type determining unit configured to determine a font type of the character;
   wherein the font type determining unit performs a font type determining process; and in the font type determining process, (a) determines a font type on a character by character basis and (b) sets as a specific font type font types of all characters in a text of the predetermined process unit if a ratio of the number of characters with the specific font type to the number of all characters in the text of the predetermined process unit exceeds a predetermined threshold value.

2. The image processing apparatus according to claim 1, wherein if no ratios of all font types of characters in a text of the predetermined process unit exceed the predetermined threshold value even though the font type determining unit determines the font types character by character, the font type determining unit sets font types of all characters in the text of the predetermined process unit as a font type with the largest ratio.

3. The image processing apparatus according to claim 1, wherein if the predetermined process unit is word, the font type determining unit (a) performs the font type determining process for a word of three or more characters and a word of one character, and (b) for a word of two characters, sets a font type of the word of two characters as a font type identical to a font type of either a previous word or a next word to the word of two characters if a font type of the previous word and a font type of the next word are identical to each other.

4. The image processing apparatus according to claim 3, wherein for the word of two characters, the font type determining unit (b1) without performing the font type determining process, sets a font type of the word of two characters as a font type identical to a font type of either a previous word or a next word to the word of two characters if a font type of the previous word and a font type of the next word are identical to each other, and (b2) performs the font type determining process if a font type of the previous word and a font type of the next word are different from each other.

5. The image processing apparatus according to claim 1, wherein for a text of a superordinate process unit of the predetermined process unit, the font type determining unit sets as a specific font type font types of all characters in a text of the superordinate process unit if a ratio of the number of texts of the predetermined process unit with the specific font type to the number of all texts of predetermined process unit in the text of the superordinate process unit exceeds a predetermined threshold value.

6. The image processing apparatus according to claim 5, wherein the predetermined process unit is word; and
   the superordinate process unit is either a line or a block as a set of lines.

* * * * *